(12) United States Patent
Ohshima

(10) Patent No.: US 6,456,929 B1
(45) Date of Patent: Sep. 24, 2002

(54) NAVIGATION SYSTEM AND METHOD FOR VEHICLES

(75) Inventor: Yuichiro Ohshima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/816,207

(22) Filed: Mar. 26, 2001

(30) Foreign Application Priority Data

Nov. 30, 2000 (JP) ........................................ 2000-364182

(51) Int. Cl.7 ............................................... G01C 21/00
(52) U.S. Cl. .......................................... 701/207; 701/27
(58) Field of Search .................................. 701/200, 207, 701/208, 211, 214, 25, 27; 340/988, 990, 995; 342/357.01, 357.08, 357.13

(56) References Cited

U.S. PATENT DOCUMENTS 5,911,773 A * 6/1999 Mutsuga et al. ............ 701/200

FOREIGN PATENT DOCUMENTS

JP A11337361 12/1999

* cited by examiner

*Primary Examiner*—Yonel Beaulieu
(74) *Attorney, Agent, or Firm*—Birch, Stewart, Kolasch & Birch, LLP

(57) ABSTRACT

A navigation system for vehicles which extracts a target facility by conducting a search using fuzzy search words inputted by a user. A facility search section 13 includes a fuzziness interpretation section 131 for converting any fuzzy search word included in the inputted character string into a defined condition (quantified criterion) and retrieves target facility using facility information of the facility to be searched on the basis of the defined condition.

16 Claims, 8 Drawing Sheets

Fig.4

| Fuzzy Search Word | Defined Condition |
|---|---|
| neighboring | Less than 10km |
| | Less than 10km ± 10% |
| | Less than 8km |
| | Less than 5km |

Fig.10

Restaurant

| Facility name | Distance | Price | Reliability |
|---|---|---|---|
| A restaurant | 3km | 5,000 Yen | 100 |
| B restaurant | 4km | 4,000 Yen | 100 |
| C restaurant | 5.2km | 4,000 Yen | 70 |
| D restaurant | 5.4km | 2,900 Yen | 40 |
| ....... | | | |

NAVIGATION SYSTEM AND METHOD FOR VEHICLES

BACKGROUND OF THE INVENTION

1. Technical Field

The present invention relates to a navigation system for vehicles that retrieves and extracts a target facility.

2. Background Art

In one of conventional navigation systems, for example, disclosed by the Japanese Patent Publication (unexamined) No.337361/1999, the system obtains date, weather information, etc. and retrieves or searches for specific facilities conforming to the obtained conditions. In this case, the search condition on date is unique, while the search condition on weather is also uniquely appointed by selecting from rain, cloudiness and fine.

However, a problem exists in that the conventional navigation systems cannot make any search taking into consideration for fuzziness. For example, it is impossible to conduct "search for an accommodation in the neighborhood" and also, in case of "search for an accommodation located within 5 km", the search is conducted for within a definitely predetermined distance, but not conducted for any accommodation slightly over the threshold value including fuzziness.

SUMMARY OF THE INVENTION

The present invention was made to solve the above-discussed problems and has an object of providing a navigation system for vehicles by which user (e.g., driver) can make search using natural fuzzy words.

A navigation system for vehicles according to the invention comprises: a location detector section for detecting a location of a vehicle; a mapping data memory section for memorizing mapping data including various kinds of facility information; an input section; an facility search section for determining a facility to be searched according to a character string inputted from the mentioned input section and for retrieving facility information of the facility to be searched from the mentioned mapping data memory section; and a display section for displaying a location of the vehicle and the facility information outputted from the mentioned facility search section; in which the mentioned facility search section includes a fuzziness interpretation section for converting any fuzzy search word included in the inputted character string into a defined condition (quantified criterion), and retrieves the target facility using the facility information of the mentioned facility to be searched on the basis of the defined condition.

As a result, it becomes possible for user to extract any target facility by the search using natural fuzzy words.

It is preferable that the defined condition can be selectively changed.

As a result, any fussy search word is converted into one of the defined conditions required by user.

It is also preferable that the defined condition is an approximated condition, and a target facility can be extracted and outputted using the facility information of the facility to be searched on the basis of the approximately defined condition.

As a result, it becomes possible to define the fuzziness around a certain threshold value and to retrieve and extract the target facility from the fuzzy word.

It is also preferable that the fuzziness interpretation section converts a plurality of inputted fuzzy search words into a plurality of defined conditions and, at the same time, judges a conjunctive relation between the mentioned plurality of fuzzy search words.

As a result, it becomes possible to appropriately retrieve and extract the target facility from the plurality of fuzzy search words having the conjunctive relation with each other.

It is also preferable that the fuzziness interpretation section converts a plurality of inputted fuzzy search words into a plurality of approximately defined conditions and, at the same time, judges a conjunctive relation between the mentioned plurality of fuzzy search words. As a result, it becomes possible to define the fuzziness around a certain threshold value and, it becomes possible to appropriately retrieve and extract the target facility from the plurality of fuzzy search words having the conjunctive relation with each other.

It is also preferable that fuzzy search words are converted into approximately defined conditions and reliability in the mentioned fuzzy search words is acknowledged for the facility extracted on the basis of the approximately defined conditions.

As a result, it becomes possible to find a target facility with higher reliability.

It is also preferable that fuzzy search words are converted into approximately defined conditions and reliability in the mentioned fuzzy search words is acknowledged for the facility extracted on the basis of the approximately defined conditions using a membership function established for the mentioned fuzzy search words.

As a result, it becomes possible to find a target facility with higher reliability.

It is preferable that fuzzy search words of negative meaning are converted into approximately defined conditions and reliability in the mentioned fuzzy search words of negative meaning is acknowledged for the facility extracted on the basis of the approximately defined conditions, using an established membership function.

As a result, it becomes possible to find a target facility with higher reliability.

BRIEF DESCRIPTION OF THE DRAWINGS

FIG. 4 is a diagram showing dictionary data for converting a fuzzy word into defined condition.

FIG. 10 is a diagram showing reliability of a facility extracted in Embodiment 4.

DESCRIPTION OF THE PREFERRED EMBODIMENTS

Embodiment 1.

Figure 1:
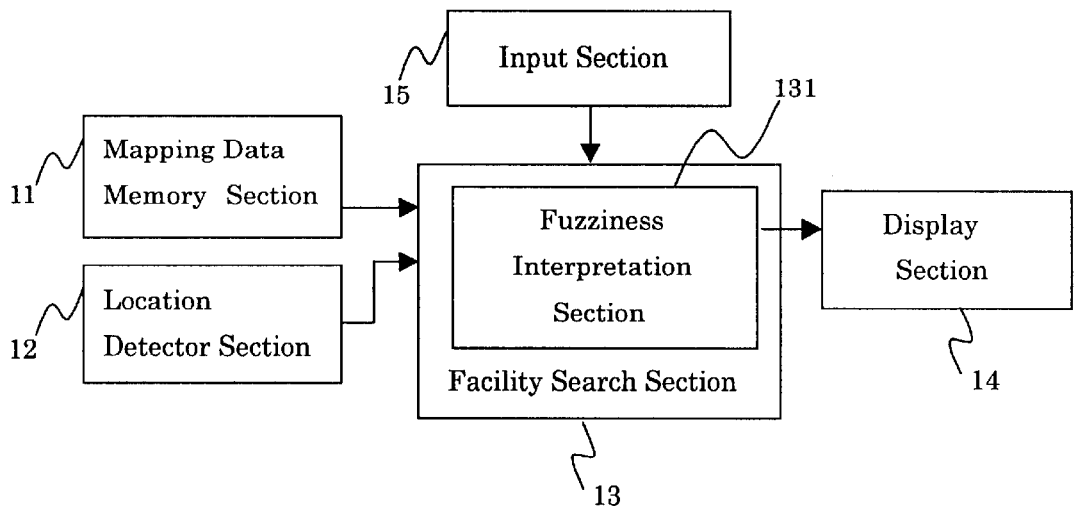
FIG. 1 is a block diagram of a navigation system for vehicles according to Embodiment 1 of the present invention.

FIG. 1 represents a block diagram of a navigation system for a vehicle according to Embodiment 1 of the present invention. Reference numeral 11 is a mapping data memory section for memorizing mapping data including information of various facilities, and numeral 12 is a location detector section for detecting a location of a vehicle. Numeral 13 is a facility search section for judging a concerned facility to be searched from a character string inputted through an input section 15. The facility search section 13 searches for facility information of the concerned facility to be searched from the mapping data memory section 11 and includes a fuzziness interpretation section 131 for converting a fuzzy word, included in the inputted character string, into a defined condition. Numeral 14 is a display section, such as a display monitor, for displaying a location of the vehicle, facility information outputted from the facility search engine 13, etc., to the user. Numeral 15 is an input section, through which the user inputs a character string, comprising a key board, remote control keys, a touch panel, keys disposed in a front panel, a voice input unit with a voice recognition function, etc.

Figure 2:
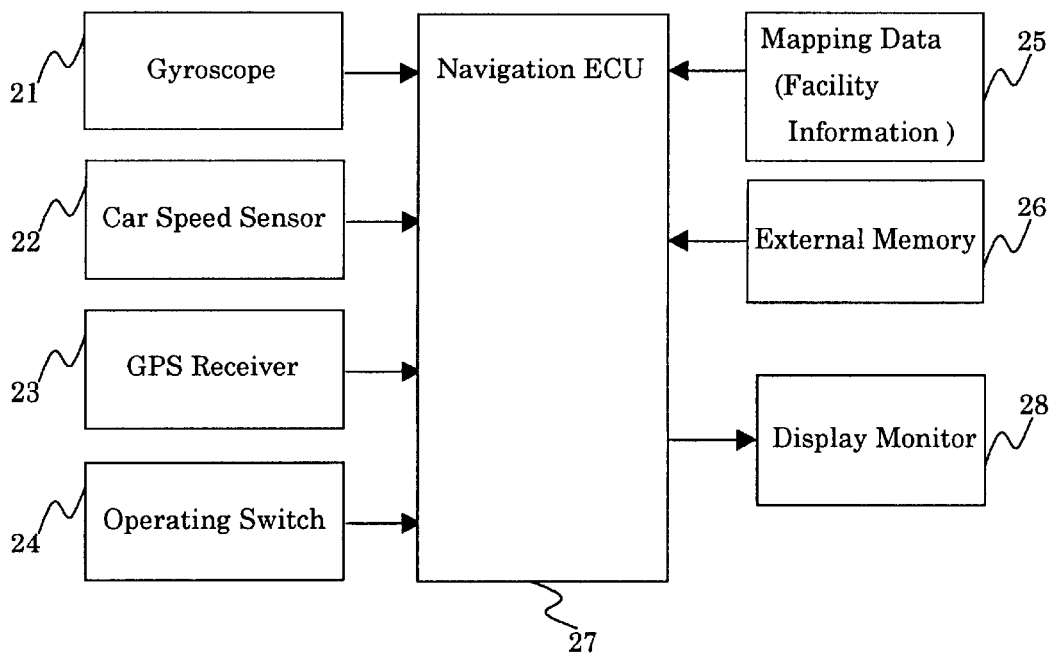
FIG. 2 is a schematic block diagram showing a schematic construction shown in FIG. 1.

Referring now to FIG. 2 showing a schematic block diagram of the schematic construction shown in FIG. 1, reference numeral 21 is an azimuth sensor such as gyroscope, and numeral 22 is a car speed sensor to determine car speed from car speed pulses. Numeral 23 is a GPS (Global Positioning System) receiver, which outputs the present location of the vehicle in the form of, e.g., information of longitude and latitude degrees. Numerals 21, 22 and 23 are included in the location detector section 12 shown in FIG. 1. Numeral 24 is an operating switch corresponding to the input section 15 shown in FIG. 1. Numeral 25 is mapping data including facility information corresponding to the mapping data memory section 11 shown in FIG. 1. Memorized in the facility information are varieties of information such as name, location, business hour, price, or parking space relating to the facility concerned.

A navigation ECU (electronic control unit) 27 carries out predetermined calculations on the basis of each output value using an external memory 26. The facility search section 13 and the fuzziness interpretation section 131 are implemented as respective functions of this navigation ECU 27. The location of the vehicle and the retrieved facility information are displayed on the display monitor 28.

Figure 3:
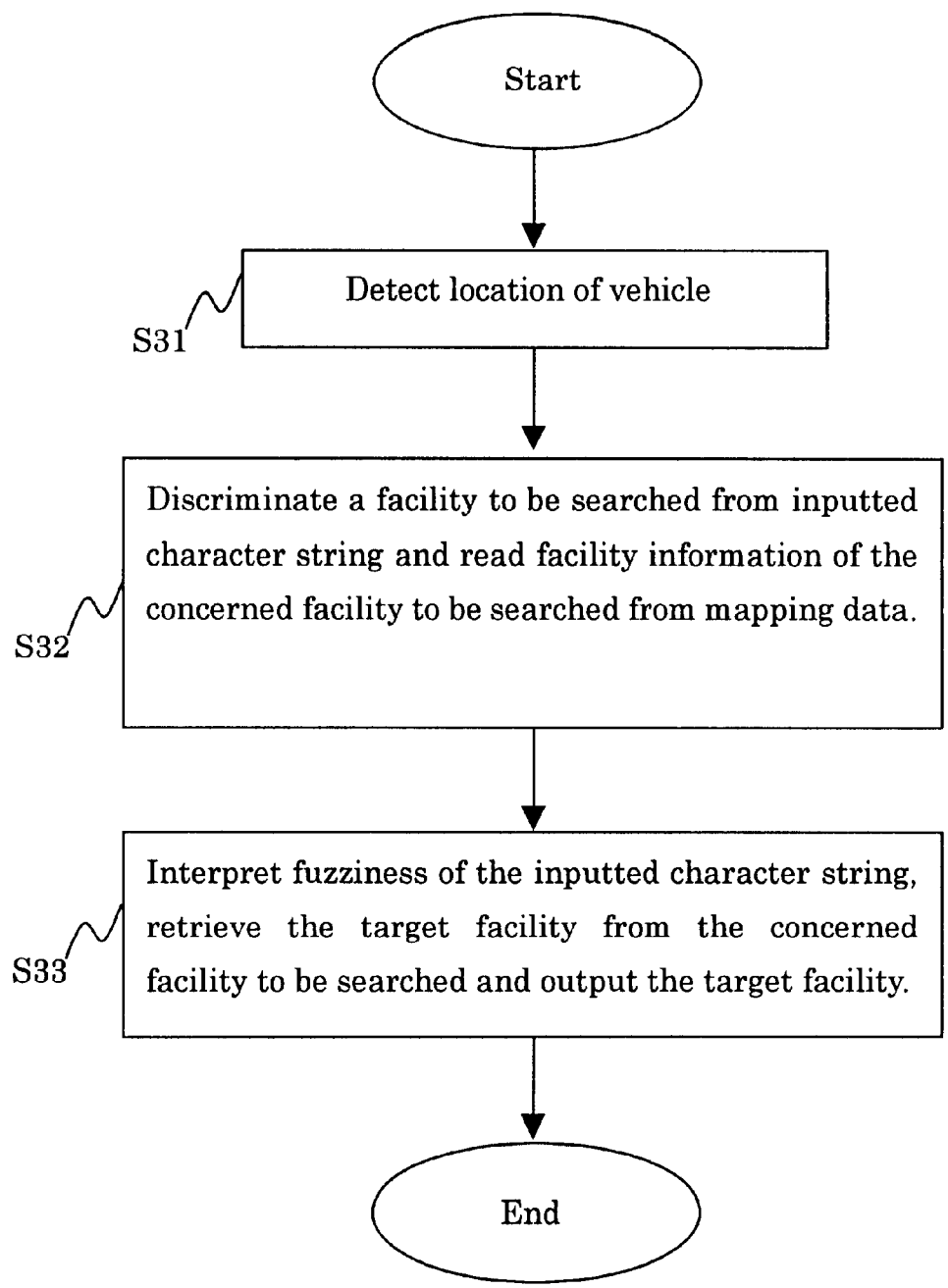
FIG. 3 is a flow chart showing operation of Embodiment 1.

Now, operation of this Embodiment 1 is hereinafter described with reference to FIG. 3 showing a flow chart of operation of Embodiment 1.

Referring to FIG. 3, in the first step, location of the vehicle is detected (S31). Then, from the inputted character string (e.g., neighboring restaurant), a concerned facility to be searched (a restaurant) is determined and, from the mapping data memory, facility information of the concerned facility to be searched (the restaurant) is read in (S32). Subsequently, fuzziness interpretation is conducted. A fuzzy search word, e.g., "neighboring" is converted into a defined condition "less than 10 km" using the dictionary data shown in FIG. 4 and, a facility corresponding to the fuzziness decision, i.e., a facility corresponding to the defined condition "less than 10 km" is extracted from the facility information of the target facility to be searched (restaurant) and is outputted as the target facility (S33). In this case, as the search object is a facility in the neighborhood of the present location of the vehicle, the facility located within "less than 10 km" from the vehicle location is searched. On the other hand, in case that the facility in the neighborhood of a destination is searched, the facility located within "less than 10 km" from the destination is searched.

Embodiment 2

In the foregoing fuzziness interpretation process, it is also possible that the fuzzy search word, e.g., "neighboring" is converted into an approximated criterion "less than 10 km±10%" (either less than 9 km or less than 11 km) using the dictionary data shown in FIG. 4, and the facility corresponding to the fuzziness interpretation, i.e., the facility corresponding to the defined condition "less than 10 km±0%" is extracted from the facility information of the concerned facility to be searched (restaurant) and is outputted as the target facility (S33). In this case, the facility to be searched is preferably retrieved in combination with search conditions such as number of search facilities, etc. Then the facility most suited for the search conditions such as number of search facilities, etc. within the range of mentioned ±10% is extracted.

Embodiment 3

Figure 5:
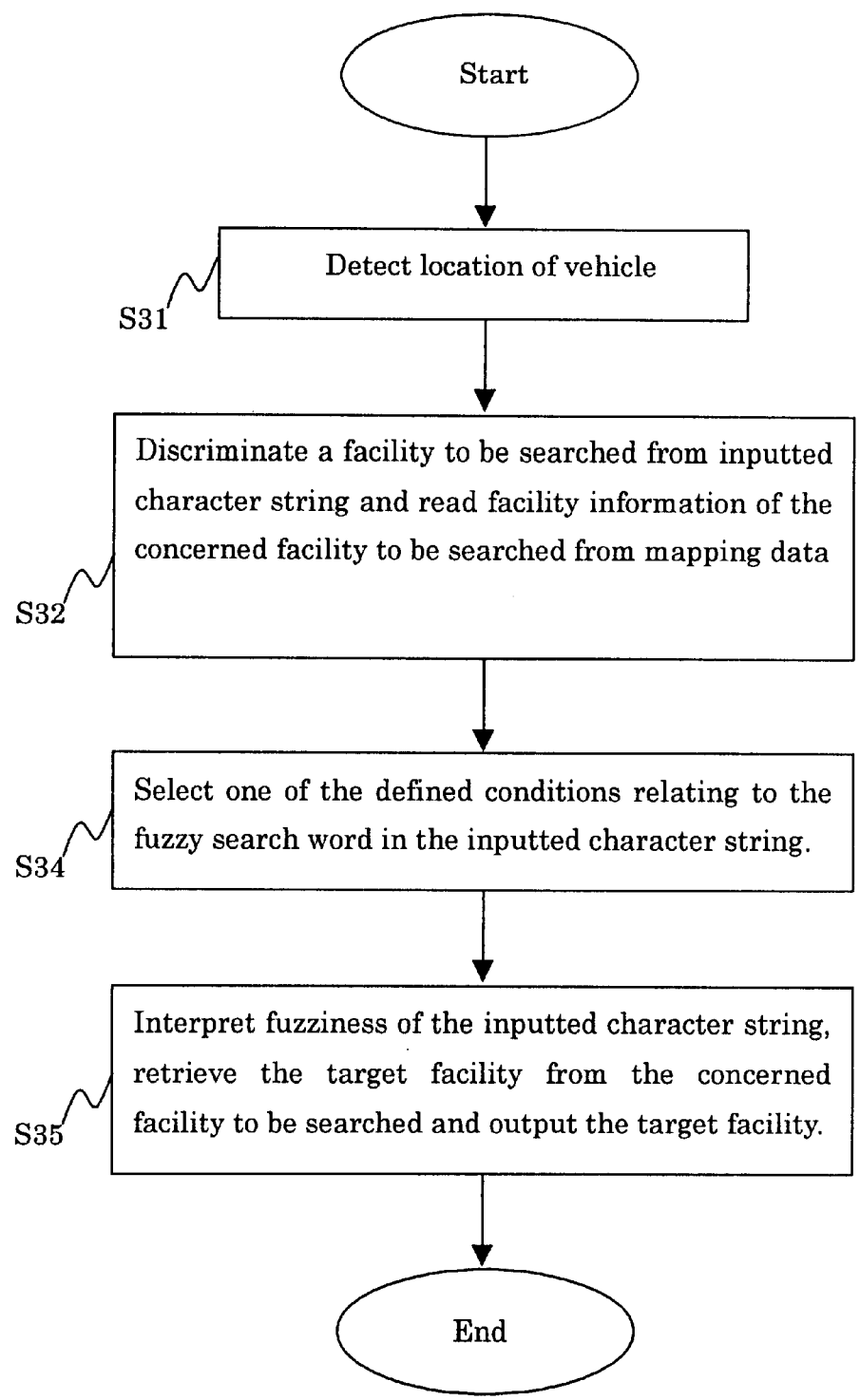
FIG. 5 is a flow chart showing operation of Embodiment 2.

FIG. 5 is a flow chart showing operation of the navigation system according to Embodiment 2. Steps S31 and S32 are the same as those in the foregoing Embodiment 1. Then, fuzziness interpretation is conducted. User selects one of the defined conditions "less than 10 km", "less than 8 km" and "less than 5 km" (using the dictionary data shown in FIG. 4), which corresponds to the fuzzy word "neighboring" (S34). The facility corresponding to the fuzziness interpretation on the basis of the selected criterion, e.g., "less than 5 km" is extracted from the facility information of the concerned facility to be searched (restaurant) and is outputted as the target facility (S35)

Embodiment 4

Figure 6:
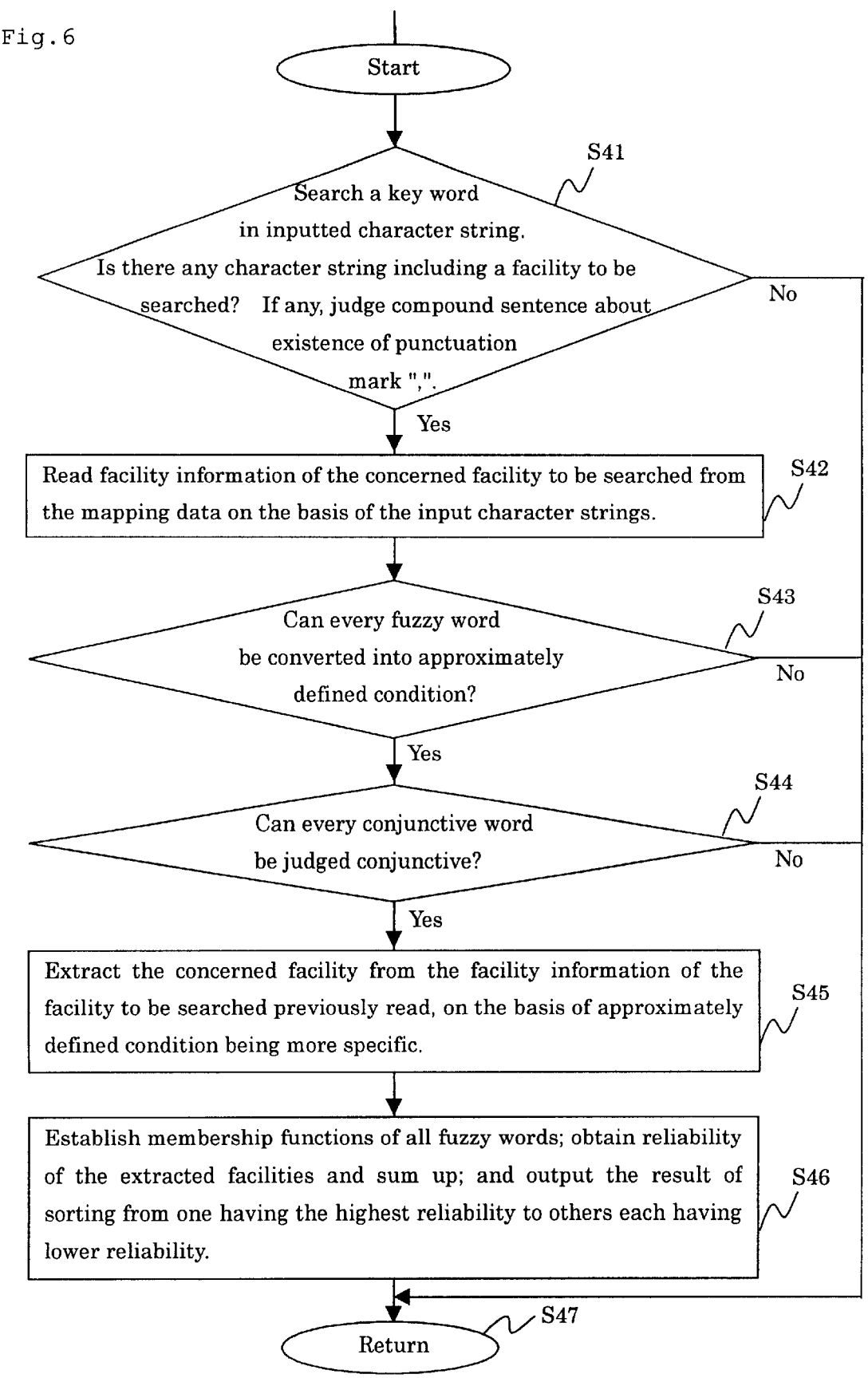
FIG. 6 is a flow chart showing operation of Embodiment 4.

FIG. 6 is a flow chart explaining a method for the fuzziness interpretation according to Embodiment 4. Referring to FIG. 6, a key word of the facility such as restaurant, recreation ground, shop, public office etc. is searched from among the inputted character string to determine whether or not any character string to be searched is found in the inputted character string. If it is found, judgment of compound sentence about whether or not there exists any punctuation mark "," is conducted at the same time (S41: Yes) Then, the facility information of the concerned facility to be searched is read from the mapping data on the basis of the character string (e.g., restaurant) to be searched (S42). On the other hand, if any mentioned character string to be searched is not found (S41: No), the search becomes fault and goes on return step (S47).

Figure 7:
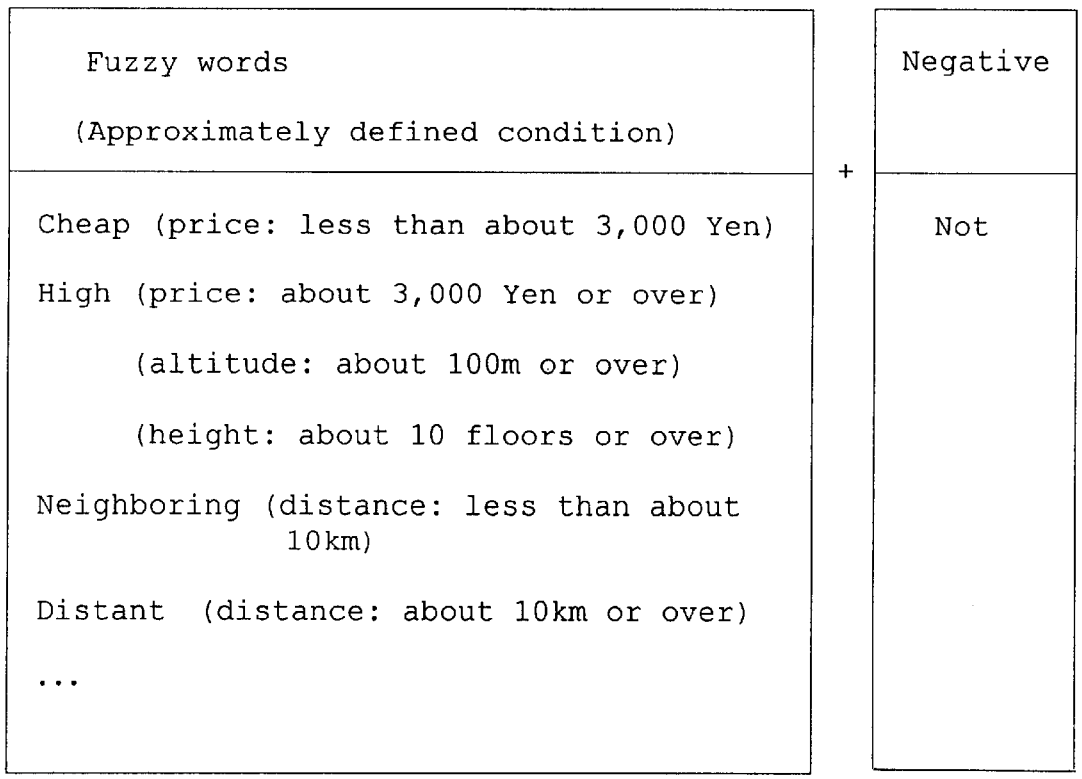
FIG. 7 is a diagram showing dictionary data for converting fuzzy words into approximately defined conditions.

In Step S43, the fuzzy search words in the inputted character string are converted into approximately defined conditions using dictionary data shown in FIG. 7. FIG. 7 is a diagram showing an example of dictionary data for converting each of fuzzy words into the approximately defined condition.

For example, a fuzzy word, "neighboring" is converted into an approximately defined condition "less than 10 km approx.". Likewise, in case of "not cheap", considering that this word is a combination of "cheap" (fuzzy word)+(plus) "not" (negation), that is, "less than about 3,000 Yen" plus "not" (negation), it is interpreted as "approximately 3,000 Yen or over". In this manner, all fuzzy search words are converted into approximately defined conditions (S43: Yes). On the other hand, in case that conversion of any fuzzy word is impossible because of not entered in the mentioned dictionary data or so, the search becomes fault and goes on return step S47 (S43: No).

In Step 44, judgment of the conjunctive relation between the approximately defined condition is conducted using the dictionary data of logical sum (∪) comprising the disjunctive words such as "or", "otherwise", or "either" and, the dictionary data of logical product (∩) comprising the conjunctive words such as "and", "as well as" "also" or "with" in the character strings of the approximately defined conditions converted from every fuzzy search words. Then, referring to the judgment of compound sentence in Step S41, every conjunctive word in the character strings is converted (S44: Yes). On the other hand, if any mentioned character string to be searched is not found (S41: No), the search becomes fault and goes on return step (S47).

Through the mentioned Steps, for example, the character string of the compound sentence "a restaurant in the neighborhood located within approximately 5 km but not cheap, or a restaurant distant and cheap" is converted to "restaurant (located within approximately 5 km ∩ less than approximately 10 km ∩ approximately 3,000 Yen or over) ∪ (longer than approximately 10 km ∩ less than approximately 3,000 Yen)".

Then, in Step 45, the approximately defined condition is further converted to an approximately defined condition being more specific. For example, "approximately" in the approximately defined condition is more specifically converted into "±10%" so that the character string of the mentioned compound sentence is expressed as "restaurant located within (5 km±10% ∩ less than 10 km±10% ∩ 3,000 Yen or over) ∪(10 km±10% or over ∪ less than 3,000 Yen±10%)". Thus, a facility, which meets the mentioned character string, is extracted from the facility information previously read in (S45).

Figure 8:
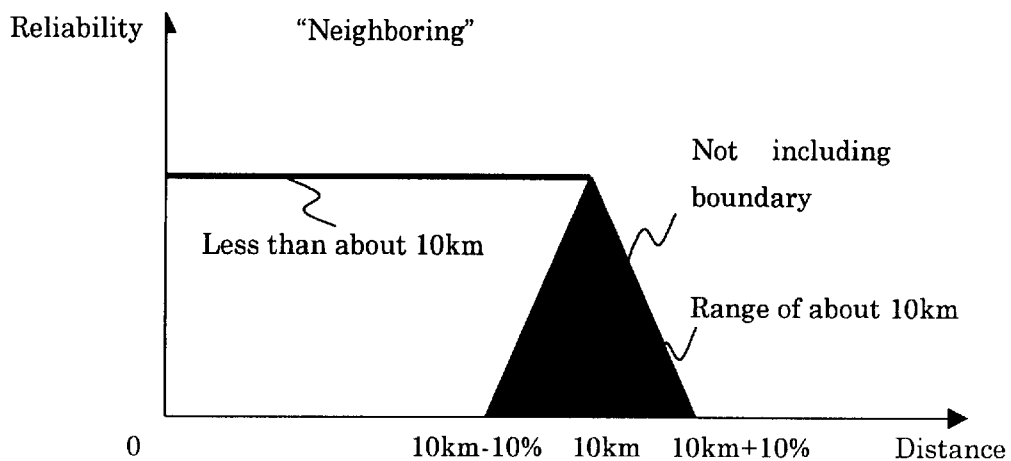
FIG. 8 is a graph showing a membership function of a fuzzy word.
Figure 9:
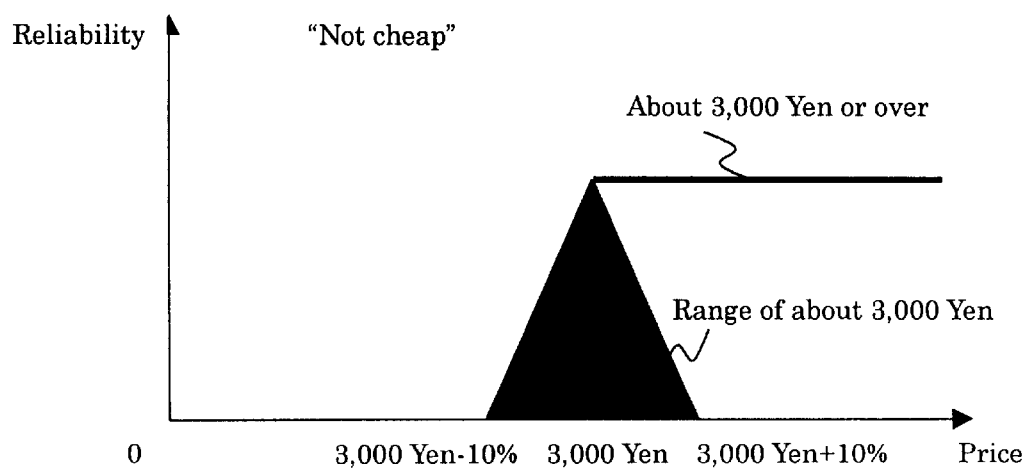
FIG. 9 is a graph showing a membership function of another fuzzy word.

In Step 46, reliability is found. FIGS. 8 and 9 are graphs respectively showing examples of membership functions of the fuzzy words on the basis of the more specified approximately defined conditions.

FIG. 8 is a graph showing a membership function of the more specified approximately defined wording "distance: less than 10 km±10%" converted more specifically from the fuzzy word "neighboring". FIG. 9 is a graph showing a membership function of the more specified approximately defined word "price: 3,000 Yen±10% or over" converted more specifically from the fuzzy word "not cheap".

As shown in FIGS. 8 and 9, the membership functions of the more specified approximately defined conditions are established for every fuzzy word mentioned above, and reliability of the extracted facilities is obtained for every fuzzy word and summed up. In this manner, the facilities are sorted from one having the highest reliability to the others each having lower reliability and, as a result, the facilities found by such sorting are outputted in return Step S47, e.g., as shown in FIG. 10.

In this Step S46, at the time of acknowledging a reliability of the facility for every more specified approximately defined condition, if price is a critical factor, it is preferable to apply a multiplication by a predetermined weight such as 1.5 times.

It is also preferable to apply a classification in order to extract the superlative like "most". For example, in case that "the most neighboring restaurant" is input, it is not enough to show only the extracted result of "restaurants within approx. 10 km±10%", but desired to extract the most reliable facility.

It is also preferable to make a distinction between the compound sentences. For example, in case that "the most neighboring and the cheapest restaurant" is inputted, as it is hard to distinguish whether it means "the most neighboring" ∩ "cheap" or "the most neighboring" ∩ "the cheapest". Accordingly, if any facility is extracted with each word distinguished by the superlative like "the most neighboring" ∩ "the cheapest", then the extraction of the facility is interrupted at that stage. If not, it is preferable to extract facilities one after another while removing the distinction by the superlative.

It is also preferable to make a distinction between the imperative or requesting words such as "search", "want to see" or "want to go" and the interrogative words such as "be there?", "be able to come?" or "which?". For example, in case that "want to go to a neighboring and cheap restaurant" is inputted, it is not enough to display only an extracted result, but desirable to display a facility extracted with the mentioned distinction, thereby extracting the superlative to get the target facility.

It is also preferable to make a distinction by multiple meanings. For example, in case that "high" is inputted, it is sometimes hard to distinguish whether it means "high in price (expensive)" or "high in altitude". If a facility for eating and drinking like a "restaurant" is requested, it is desired to choose "high in price". On the other hand, if a facility for resting or parking to enjoy a panoramic view like "observatory" is requested, it is desired to choose "high in altitude".

It is also preferable to add facility information to the mapping data as much as possible, because the more number of adjectives and adverbs for search are input, the more increases recognition rate. General information stored in the navigation system includes, for example, longitude and latitude, price, telephone number, address, number of floors, gross floor area, height above sea level, existence of infant facility. Specific information includes number of stars (☆) indicated in magazines or the like to show restaurants, number of attractions in association with recreation ground or the like, number of species in association with zoo, aquarium or the like, number of sights or hot springs in association with tourist resorts, classification of religion and so forth. In case that an inputted character string is "place with a fine view", it is possible to search it on the basis of the mentioned height above sea level or number of floors.

In this Embodiment 4, it is also preferable to utilize, e.g., a function expressing distribution probability instead of the membership function used in fuzzy theory described above.

It is also preferable to retrieve data from, e.g., media such as DVD-ROM, etc. or to store the data in ROM or RAM other than DVD-ROM, instead of holding predetermined dictionary data in the program.

It is also preferable to make it possible to externally input the mentioned weight giving an importance to price, etc. in order to reflect user's option.

It is also preferable that any character string is inputted by user's keystrokes or by effect of the voice recognition succeeding to the preliminary voice input.

What is claimed is:

1. A navigation system for vehicles comprising:

a location detector section for detecting a location of a vehicle;

a mapping data memory section for memorizing mapping data including various kinds of facility information;

an input section;

a facility search section for determining a facility to be searched according to a character string inputted from said input section and for retrieving facility information of the facility to be searched from said mapping data memory section; and a display section for displaying a location of the vehicle and the facility information outputted from said facility search section;

wherein said facility search section includes a fuzziness interpretation section for converting any fuzzy search word included in the inputted character string into a defined condition, and extracts and outputs a target facility using the facility information of said facility to be searched on the basis of the defined condition.

2. The navigation system for vehicles according to claim 1, wherein the defined condition can be selectively changed.

3. The navigation system for vehicles according to claim 1, wherein the defined condition is an approximated condition and a target facility can be extracted and outputted using the facility information of said facility to be searched on the basis of the approximately defined condition.

4. The navigation system for vehicles according to claim 1, wherein the fuzziness interpretation section converts a plurality of inputted fuzzy search words into a plurality of defined conditions and, at the same time, judges a conjunctive relation between said plurality of fuzzy search words.

5. The navigation system for vehicles according to claim 4, wherein the fuzziness interpretation section converts a plurality of inputted fuzzy search words into a plurality of approximately defined conditions and, at the same time, judges a conjunctive relation between said plurality of fuzzy search words.

6. The navigation system for vehicles according to claim 3, wherein fuzzy search words are converted into approximately defined conditions and reliability in the fuzzy search words is acknowledged for the facility extracted on the basis of the approximately defined conditions.

7. The navigation system for vehicles according to claim 6, wherein fuzzy search words are converted into approximately defined conditions and reliability in the fuzzy search words is acknowledged for the facility extracted on the basis of the approximately defined conditions, using a membership function established for the fuzzy search words.

8. The navigation system for vehicles according to claim 3, wherein fuzzy search words of negative meaning are converted into approximately defined conditions and reliability in the fuzzy search words of negative meaning is acknowledged for the facility extracted on the basis of the approximately defined condition, using an established membership function.

9. A method for inputting data into a navigation system for vehicles, the steps comprising:

inputting a character string;

determining a facility to be searched according to said inputting character string;

retrieving facility information of the facility to be searched from a mapping data memory section; and displaying a location of said vehicle and said facility information, wherein a fuzziness interpretation section converts any fuzzy search word included in said inputted character string into a defined condition, and extracts and outputs a target facility using said facility information on the basis of said defined condition.

10. The method according to claim 9, wherein the defined condition can be selectively changed.

11. The method according to claim 9, wherein the defined condition is an approximated condition and a target facility can be extracted and outputted using the facility information of said facility to be searched on the basis of the approximately defined condition.

12. The method according to claim 9, wherein the fuzziness interpretation section converts a plurality of inputted fuzzy search words into a plurality of defined conditions and, at the same time, judges a conjunctive relation between said plurality of fuzzy search words.

13. The method according to claim 12, wherein the fuzziness interpretation section converts a plurality of inputted fuzzy search words into a plurality of approximately defined conditions and, at the same time, judges a conjunctive relation between said plurality of fuzzy search words.

14. The method according to claim 11, wherein fuzzy search words are converted into approximately defined conditions and reliability in the fuzzy search words is acknowledged for the facility extracted on the basis of the approximately defined conditions.

15. The method according to claim 14, wherein fuzzy search words are converted into approximately defined conditions and reliability in the fuzzy search words is acknowledged for the facility extracted on the basis of the approximately defined conditions, using a membership function established for the fuzzy search words.

16. The method according to claim 11, wherein fuzzy search words of negative meaning are converted into approximately defined conditions and reliability in the fuzzy search words of negative meaning is acknowledged for the facility extracted on the basis of the approximately defined condition, using an established membership function.

* * * * *